United States Patent
Lee (10) Patent No.: US 9,761,199 B2
(45) Date of Patent: Sep. 12, 2017

(54) OPTICAL NAVIGATION SYSTEM AND DETECTION METHOD THEREOF ADAPTED FOR AMBIENT LIGHT AND LIFTOFF DETECTION

(71) Applicant: PixArt Imaging Inc., Hsin-Chu County (TW)

(72) Inventor: Yu-Ju Lee, Hsin-Chu County (TW)

(73) Assignee: PixArt Imaging Inc., Hsin-Chu County (TW)

( * ) Notice: Subject to any disclaimer, the term of this patent is extended or adjusted under 35 U.S.C. 154(b) by 398 days.

(21) Appl. No.: 14/515,936

(22) Filed: Oct. 16, 2014

(65) Prior Publication Data

US 2015/0144768 A1 May 28, 2015

(30) Foreign Application Priority Data

Nov. 28, 2013 (TW) .............................. 102143671 A (51) Int. Cl.
| | |
|---|---|
| G01C 21/00 | (2006.01) |
| G09G 5/08 | (2006.01) |
| G06F 1/32 | (2006.01) |
| G06F 3/03 | (2006.01) |

(52) U.S. Cl.
CPC .............. G09G 5/08 (2013.01); G06F 1/3259 (2013.01); G06F 3/0317 (2013.01); G09G 2360/144 (2013.01); Y02B 60/1253 (2013.01)

(58) Field of Classification Search
CPC ... G06F 1/3259; G06F 3/03549; G01C 21/00; G01C 21/20; G09G 5/08; G01B 11/14

USPC .................................................. 250/221, 205
See application file for complete search history.

(56) References Cited

U.S. PATENT DOCUMENTS

| | | | |
|---|---|---|---|
| 8,044,936 B2 | 10/2011 | Kwak et al. | |
| 9,354,717 B2* | 5/2016 | Huang | ................. G06F 1/3259 |
| 2007/0132734 A1 | 6/2007 | Kwak et al. | |
| 2013/0113705 A1 | 5/2013 | Gu et al. | |

FOREIGN PATENT DOCUMENTS

| | | |
|---|---|---|
| CN | 101048843 A | 10/2007 |
| TW | 200701042 | 1/2007 |
| TW | I331293 B | 10/2010 |
| TW | 201319876 A | 5/2013 |

* cited by examiner

*Primary Examiner* — Que T Le
(74) *Attorney, Agent, or Firm* — Hauptman Ham, LLP (57) ABSTRACT

There is provided an optical navigation system including a light source, a first photosensitive unit, a second photosensitive unit, a control unit and a processing unit. The light source is configured to emit light of a predetermined wavelength. The first photosensitive unit is configured to receive reflected light of the predetermined wavelength reflected by a working surface. The second photosensitive unit is covered with a coating to block light of the predetermined wavelength. The control unit is configured to control the light source, the first photosensitive unit and the second photosensitive unit to expose both the first photosensitive unit and the second photosensitive unit when the light source is turned on. The processing unit is configured to read first image data and second image data respectively from the first photosensitive unit and the second photosensitive unit thereby identifying an ambient light mode or a liftoff mode.

20 Claims, 8 Drawing Sheets

OPTICAL NAVIGATION SYSTEM AND DETECTION METHOD THEREOF ADAPTED FOR AMBIENT LIGHT AND LIFTOFF DETECTION

RELATED APPLICATIONS

The present application is based on and claims priority to Taiwanese Application Number 102143671, filed Nov. 28, 2013, the disclosure of which is hereby incorporated by reference herein in its entirety.

BACKGROUND

1. Field of the Disclosure

This disclosure generally relates to an optical navigation system and, more particularly, to an optical navigation system and detection method thereof capable of detecting ambient light and liftoff.

2. Description of the Related Art

The conventional optical navigation device, such as an optical mouse, generally has a light source, an image sensor and a processing unit. When a user operates the optical mouse on a working surface, the light source illuminates the working surface and the image sensor receives light reflected from the working surface. The processing unit of the optical mouse calculates a movement value corresponding to the user's operation according to the images successively captured by the image sensor and converts the movement value to an electric signal. A host then relatively controls a cursor movement according to the electric signal.

However, the optical mouse possibly leaves the working surface due to the user's operation when being operated. If the optical mouse still captures inexact images of the working surface, the processing unit calculates an incorrect movement value thereby causing misoperation such as the cursor jitter.

Figure 1:
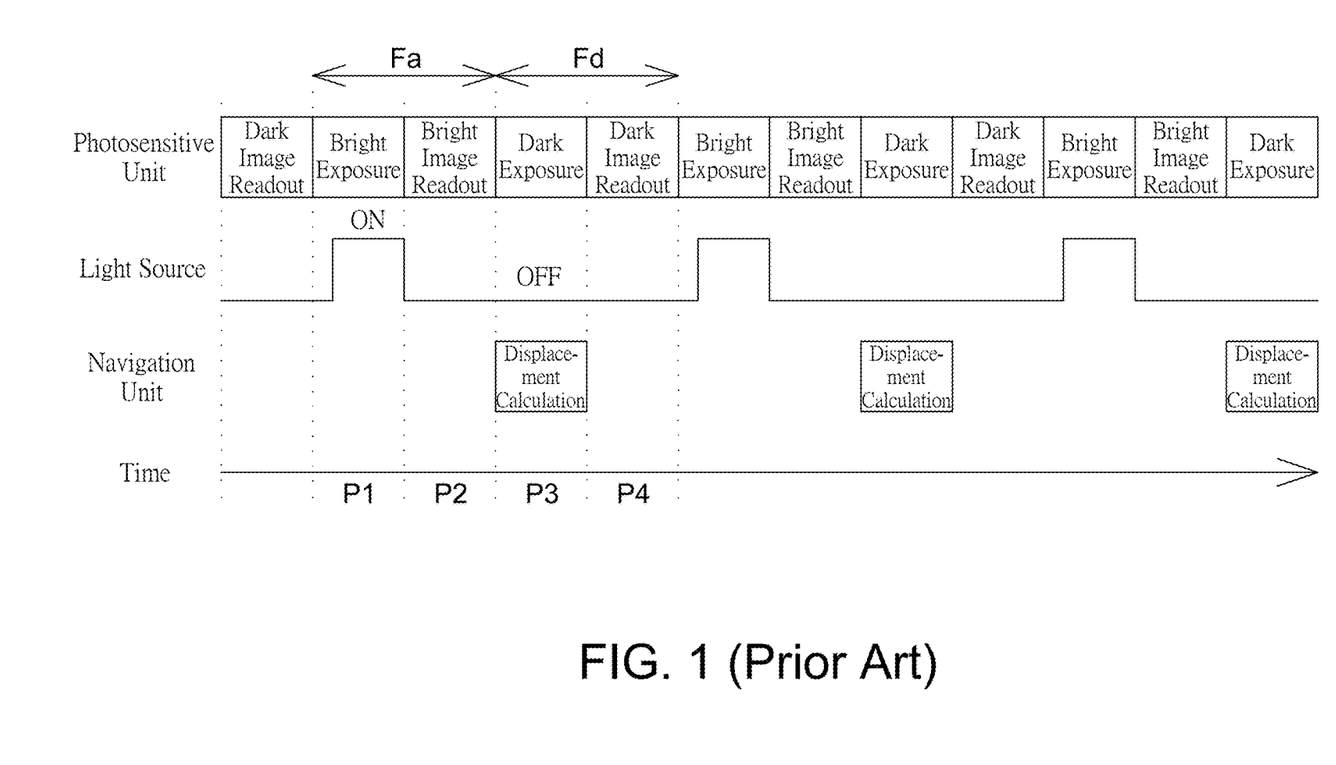
FIG. 1 is a timing diagram of a conventional optical navigation system.

In order to allow the optical navigation system to stop calculating movement values and reduce power consumption when the optical navigation leaves the working surface, U.S. Pat. No. 8,044,936, entitled "Optical navigation device and method of operating the same" discloses an optical navigation device that detects whether the optical navigation device leaves a working surface to prevent misoperation and reduce unnecessary power consumption. FIG. 1 is a timing diagram provided by the prior art and the timing control thereof is composed of an effective frame Fa and a dark frame Fd arranged alternatively, wherein the effective frame Fa includes a first period P1 and a second period P2, and the dark frame Fd includes a third period P3 and a fourth period P4. The first period P1 is a bright exposure period (i.e. exposing a photosensitive unit when the light source is being turned on). The second period P2 is a bright image readout period. The third period P3 is the dark exposure period (i.e. exposing the photosensitive unit when the light source is turned off) and displacement calculation period. The fourth period P4 is a dark image readout period. The prior art is to insert the dark frame Fd right after the effective frame Fa to obtain dark image intensity, and then compare the dark image intensity with bright image intensity of the effective frame Fa so as to detect whether the optical navigation device is lifted off.

However, an optical navigation system calculates displacement according to successive bright images. The method which detects liftoff through inserting a dark image between two bright images according to the prior art causes an extension of a time gap between the two bright images thereby decreasing the frequency (or bandwidth). In a high speed optical navigation system (e.g. a gaming mouse), a relatively higher effective frame rate is needed for supporting the liftoff detection and maintaining an identical bandwidth simultaneously. Therefore, if it is desired to maintain an identical tracking speed by using the conventional method mentioned above, the power consumption of the optical navigation system is increased.

SUMMARY

Accordingly, the present disclosure further provides an optical navigation system and a detection method thereof that improve the timing control of the photosensitive element so as to detect ambient light and liftoff.

The present disclosure provides an optical navigation system and a detection method thereof capable of detecting ambient light and liftoff that achieve the purpose of ambient light and liftoff detection under the condition of maintaining an original tracking frame rate of the optical navigation system.

The present disclosure further provides an optical navigation system and a detection method thereof capable of detecting ambient light and liftoff that have the effect of preventing misoperation of the optical navigation system.

The present disclosure further provides an optical navigation system and a detection method thereof capable of detecting ambient light and liftoff that have the effect of reducing power consumption of the optical navigation system.

The present disclosure provides a detection method of an optical navigation system, which uses a photosensitive unit to repeatedly capture image frames and each of the image frames includes a first period and a second period. The detection method includes the steps of: turning on a light source and exposing the photosensitive unit in the first period of a first image frame; reading first image data from the photosensitive unit in the second period of the first image frame; turning off the light source and exposing a part of the photosensitive unit in the second period of the first image frame; and reading second image data from the part of the photosensitive unit in the first period of a second image frame, wherein the first image data comprises first light intensity and the second image data comprises second light intensity, and the second image frame is a successive image frame following the first image frame.

The present disclosure further provides a detection method of an optical navigation system, which uses a first photosensitive unit and a second photosensitive unit covered with a coating to repeatedly capture image frames and each of the image frames includes a first period and a second period. The detection method includes the steps of: turning on a light source and simultaneously exposing the first photosensitive unit and the second photosensitive unit in the first period of a first image frame; turning off the light source in the second period of the first image frame and reading first image data from the first photosensitive unit; and reading second image data from the second photosensitive unit in the second period of the first image frame or the first period of a second image frame, wherein the first image data comprises first light intensity and the second image data comprises second light intensity, and the second image frame is a successive image frame following the first image frame.

The present disclosure further provides an optical navigation system. The optical navigation system is configured to be operated on a working surface and includes a light source, a first photosensitive unit, a second photosensitive unit, a control unit and a processing unit. The light source is configured to emit light of a predetermined wavelength. The first photosensitive unit is configured to receive reflected light of the predetermined wavelength reflected by the working surface. The second photosensitive unit is covered with a coating to block the light of the predetermined wavelength. The control unit is configured to control the light source, the first photosensitive unit and the second photosensitive unit to simultaneously expose the first photosensitive unit and the second photosensitive unit when the light source is being turned on. The processing unit is configured to read first image data and second image data respectively from the first photosensitive unit and the second photosensitive unit.

The present disclosure further provides an optical navigation system. The optical navigation system is configured to be operated on a working surface and includes a light source, a photosensitive unit, a control unit and a processing unit. The light source is configured to be successively turned on and off in every image frame period. The photosensitive unit is configured to receive reflected light of the light source reflected by the working surface. The control unit is configured to control the light source and the photosensitive unit so as to expose a pixel array of the photosensitive unit when the light source is being turned on and expose only a part of the pixel array of the photosensitive unit when the light source is turned off. The processing unit is configured to read a first image data from the pixel array of the photosensitive unit when the light source is turned off and read a second image data from the part of the pixel array of the photosensitive unit when the light source is turned on, wherein the control unit controls the part of the pixel array of the photosensitive unit to be exposed simultaneously when the processing unit is reading the first image data.

In some embodiments, a processing unit successively reads the first image data and the second image data.

In some embodiments, a second part of the photosensitive unit is dark exposed simultaneously when the first image data of a first part of the photosensitive unit is being read so as to shorten the total time in reading data.

In some embodiments, the first photosensitive unit and the second photosensitive unit are coupled to an identical driving circuit or different driving circuits. When the first photosensitive unit and the second photosensitive unit are coupled to different driving circuits or reading circuits, the first photosensitive unit and the second photosensitive unit work simultaneously or successively. In addition, a sensing surface of the first photosensitive unit and a sensing surface of the second photosensitive unit are on a same plane or separated surfaces.

The optical navigation system according to the embodiment of the present disclosure detects ambient light and liftoff through the improvement of the photosensitive unit and timing control so as to achieve the effect of avoiding mistakenly outputting displacement without reducing the tracking frame rate of the optical navigation system.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

In the following descriptions, an optical navigation system of the present disclosure is described with embodiments. However, the embodiment of the present disclosure is not limited to any particular environment, application or implementation. Therefore, the following descriptions of embodiments are for purpose of illustration only but not to limit the present disclosure. It is understood that elements indirectly related to the present disclosure are omitted and not shown in the following embodiments and drawings.

Figure 2:
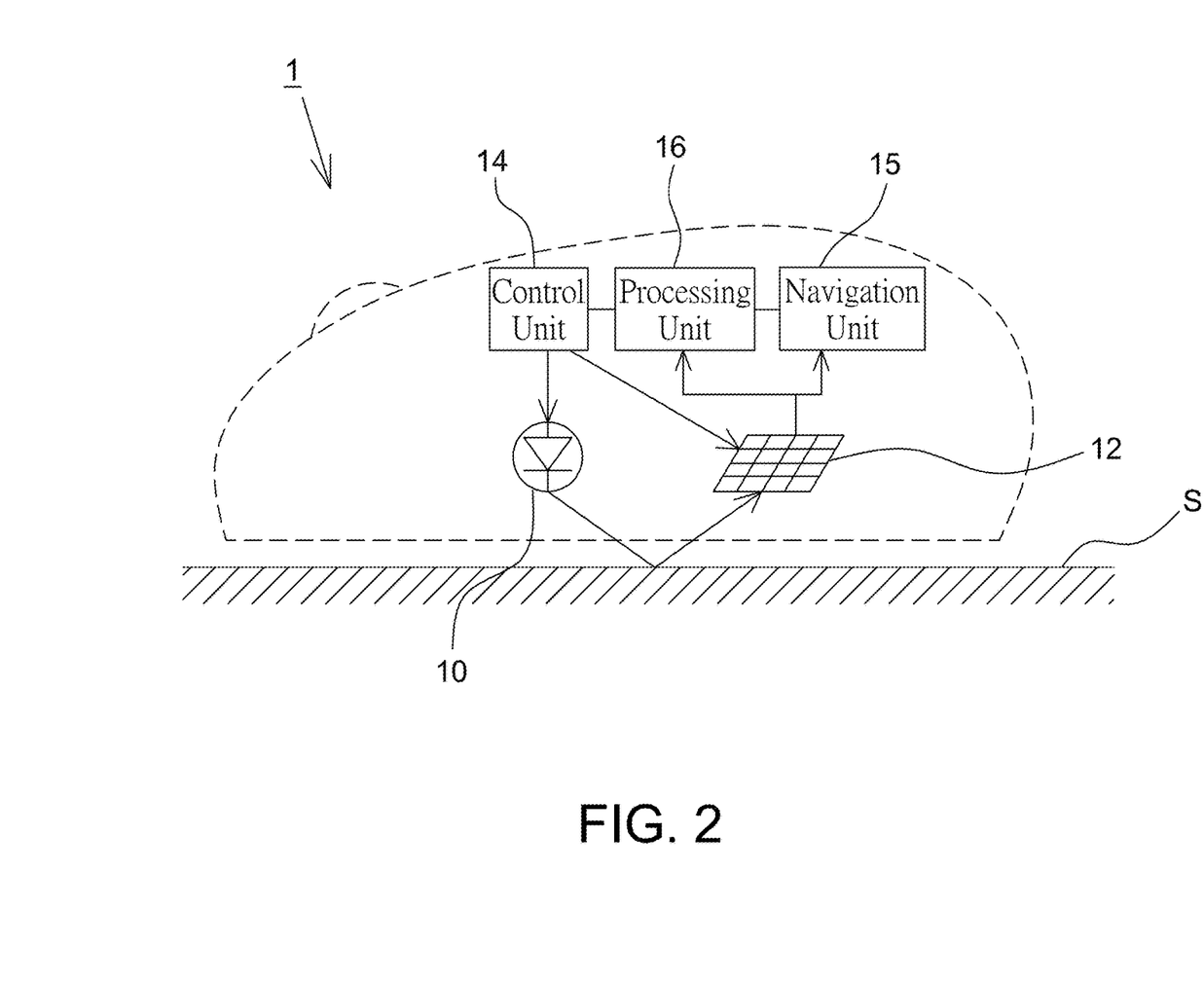
FIG. 2 is a schematic diagram of an optical navigation system according to an embodiment of the present disclosure.

FIG. 2 is a schematic diagram of an optical navigation system 1 according to some embodiments of the present disclosure. The optical navigation system 1 is configured to be operated on a working surface S. The optical navigation system 1 includes a light source 10, a photosensitive unit 12, a control unit 14, a navigation unit 15 and a processing unit 16. The light source 10 and the photosensitive unit 12 are electrically connected to the control unit 14, and the control unit 14 and the navigation unit 15 are electrically connected to the processing unit 16. A user (not shown) moves the optical navigation system 1 through a palm or a plurality of fingers, and the navigation unit 15 generates a movement value to a host (not shown) according to the optical navigation system 1 with respect to the working surface S so as to accomplish a corresponding action or perform a predetermined instruction. In the present embodiment, the optical navigation system 1 is an optical mouse. In other embodiments, the optical navigation system 1 is a laser mouse or a combined pointing device. Besides, the navigation unit 15 or the control unit 14 may be included in the processing unit 16.

The light source 10 is configured to emit light of a predetermined wavelength, and the predetermined wavelength is indicated for example as a central wavelength, such as red visible light of 650 nm, blue visible light of 450 nm or other invisible light. In the present embodiment, the light source 10 is a light emitting diode (LED). In other embodiments, the light source 10 is a laser diode (LD) or other active light sources.

Figure 3:
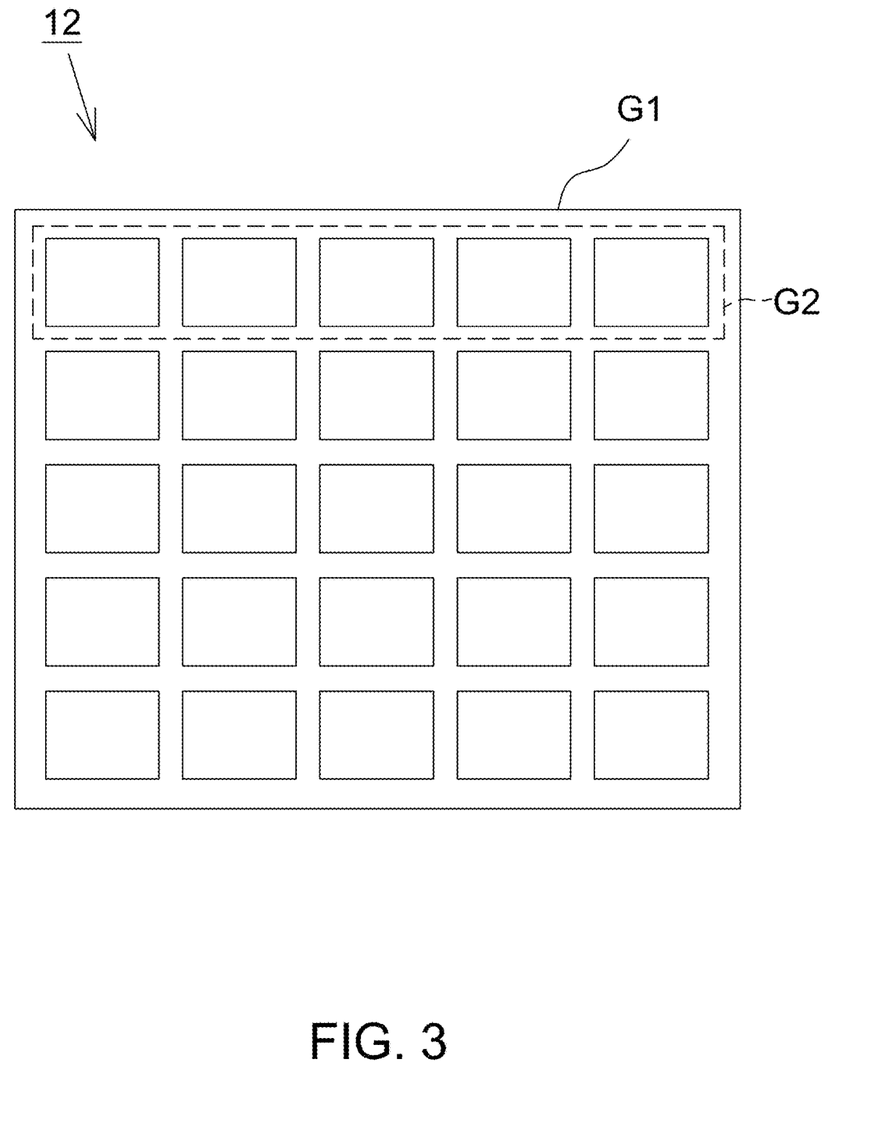
FIG. 3 is a schematic diagram of a photosensitive unit according to a first embodiment of the present disclosure.

The photosensitive unit 12 is configured to receive reflected light of the predetermined wavelength reflected by the working surface S to successively capture and output image data, wherein the photosensitive unit 12 is coupled to at least a driving circuit (not shown) of the control unit 14 and has a pixel array G1, as shown in FIG. 3. It should be mentioned that the pixel array G1 is shown as a 5×5 pixel array for example. In some embodiments, the photosensitive unit 12 is preferably an active sensor such as a complementary metal oxide semiconductor (CMOS) sensor, but not limited thereto. It should be mentioned that in order to efficiently collect the reflected light from the working surface S, the optical navigation system may be disposed with a lens (not shown) or other optical design to allow the photosensitive unit 12 to be able to capture the reflected light from the working surface S. It should be mentioned that FIG. 3 only uses a pixel array G1 to represent the photosensitive unit 12. The photosensitive unit 12 further includes a charge storage unit configured to store detected charges of the pixel array G1, an amplification unit configured to amplify detected signals of the pixel array G1 and a shutter configured to control the exposure of the pixel array G1, wherein said charge storage unit, amplification unit and shutter may be disposed corresponding to one pixel or a plurality of pixels.

The control unit 14 is configured to control the operation of the light source 10 and the photosensitive unit 12, for example, exposing the photosensitive unit 12 when the light source 10 is being turned on (referred to "bright exposure" herein). In addition, when the light source 10 is turned off, the control unit 14 may also expose the photosensitive unit 12 (referred to "dark exposure" herein). In the present embodiment, the control unit 14 is independent from the processing unit 16. In other embodiments, the control unit 14 is integrated in the processing unit 16 and the processing unit 16 directly controls the light source 10 and the photosensitive unit 12.

The processing unit 16 is, for example, a digital signal processor (DSP) or other processing devices configured to process image data, configured to read image data successively captured by the photosensitive unit 14, wherein the image data is generated from the pixel array G1 of the photosensitive unit 12. More specifically speaking, the processing unit 16 is configured to post-process the image data, e.g. calculating image data intensity according to the image data and determining a working mode accordingly. In the present embodiment, the method of the processing unit 16 calculating displacement is well known, e.g. calculating the displacement by using the correlation between images, and thus details thereof are not described herein. In some embodiments, for example, the processing unit 16 successively reads each row of the pixel array G1 e.g. reading from the first pixel to the last pixel of the first row, and successively reading every pixels of the next row till the last pixel of the last row.

Figure 4:
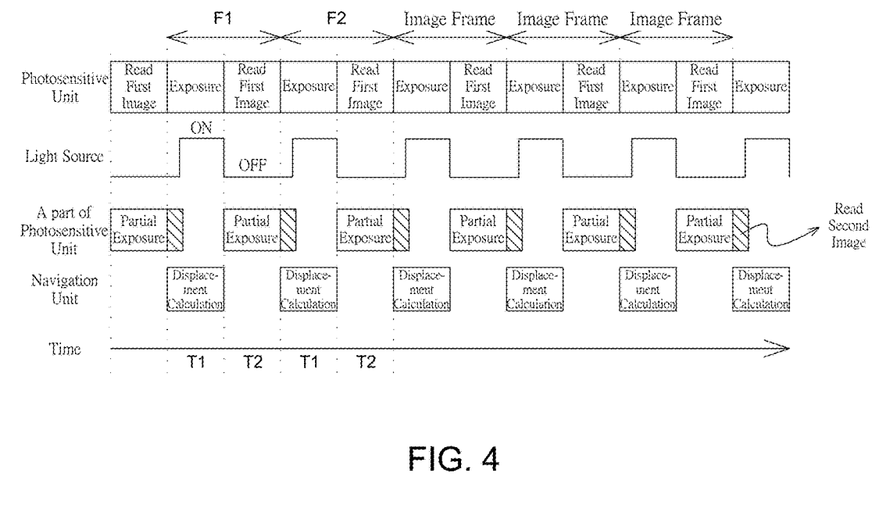
FIG. 4 is a timing diagram of a detection method of the optical navigation system according to the first embodiment of the present disclosure.

FIG. 4 is a timing diagram of a detection method of the optical navigation system 1 according to the first embodiment of the present disclosure, in which the light source 10 is successively turned on and off in every image frame period. Referring to FIGS. 2-4 together, in the detection method the photosensitive unit 12 repeatedly captures image frames (e.g. using a first image frame F1 and a second image frame F2 to describe herein) and each of the image frames includes a first period T1 and a second period T2. The detection method includes the following steps: turning on the light source 10 and exposing the entire pixel array of the photosensitive unit 12 in the first period T1 of a first image frame F1; reading first image data from the photosensitive unit 12 in the second period T2 of the first image frame F1; turning off the light source 10 and exposing a part of the photosensitive unit 12 (e.g. a part of the pixel array) in the second period T2 of the first image frame F1; and reading second image data from the part of the photosensitive unit 12 in the first period T1 of a second image frame F2, wherein the first image data includes first light intensity I1 and the second image data includes second light intensity I2, and the second image frame F2 is a successive image frame following the first image frame F1.

The navigation unit 15 calculates a movement value corresponding to the first image frame F1 in the first period T1 of the second image frame F2 according to the first image data read from the photosensitive unit 12 in the second period T2 of the first image frame F2. That is to say, the navigation unit 15 calculates, in the first period T1 of the next image frame, a movement value corresponding to the previous image frame according to the read first image data, as shown in FIG. 4.

It should be mentioned that the part of the photosensitive unit 12 is, for example, a partial pixel array G2 shown in FIG. 3, and the partial pixel array G2 is exemplarily shown as one row of the pixel array G1. It should be mentioned that since the second image data obtained in the dark exposure period is only to judge ambient light or liftoff but not to calculate the movement value, said partial pixel array G2 may include any number of pixels and be located at any position depending on the design of the control IC and is not limited to that shown in FIG. 3. In the present embodiment, the partial pixel array G2 of the photosensitive unit 12 is exposed by the control unit 14 simultaneously when the processing unit 16 is reading the first image data of the photosensitive unit 12. For example, at the same time when the processing unit 16 finishes reading image data of the partial pixel array G2 and then is reading image data other than the partial pixel array G2, the control unit 14 controls the shutter to dark expose only the partial pixel array G2 so as to implement the reading of the first image data and the dark exposing simultaneously. More specifically speaking, the pixel array G1 of the photosensitive unit 12 is not exposed entirely when the light source 10 is turned off. As long as the partial pixel array G2 is exposed, whether the optical navigation system 1 is lifted off is identifiable accordingly. The method of ambient light and liftoff detection adapted for the optical navigation system 1 is further described later.

On the other hand, the processing unit 16 reads the first image data from the photosensitive unit 12 in the second period T2 of the first image frame F1 and reads the second image data in the first period T1 of the second image frame F2 respectively. Since only the partial pixel array G2 is exposed by the light source 10, the time of the processing unit 16 reading the second image data is smaller than the time of the processing unit 16 reading the first image data. For example, the partial pixel array G2 in FIG. 3 is shown to be ⅕ of the pixel array G1, and the time of the processing unit 16 reading the second image data is ⅕ of the time of the processing unit 16 reading the first image data (i.e. ⅕ of the first period T1 of the second image frame F2). Therefore, after the processing unit 16 continuously reads the first image data and second image data, the light source 10 has enough turn-on time in the first period T1 of the second image frame F2 so as to allow the control unit 14 to bright expose the photosensitive unit 12 to obtain the first image data of the second image frame F2.

Figure 5:
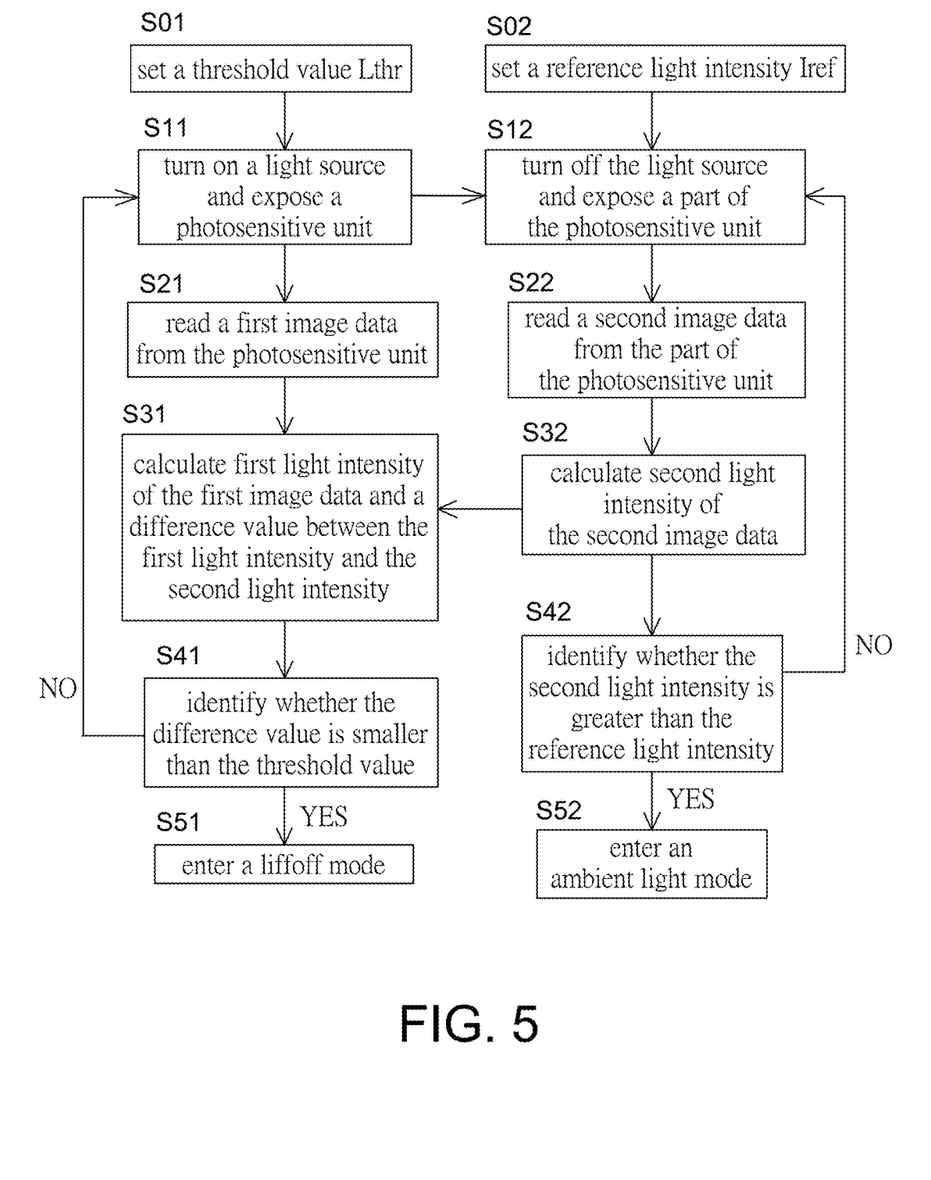
FIG. 5 is a flow chart of the detection method of the optical navigation system according to the first embodiment of the present disclosure.

FIG. 5 is a flow chart of the detection method of the optical navigation system 1 according to the first embodiment of the present disclosure, wherein the detection method has two functions: one is the liftoff detection and the other one is the ambient light detection. When the optical navigation system 1 leaves the working surface S due to the movement of the user's hand, e.g. when the user lifts the optical navigation system 1 from a position of the working surface S and moves the optical navigation system 1 to another position of the working surface S, the navigation unit 15 may be stopped outputting the movement value (or deactivate or slow down the operation of other partial elements) through the liftoff detection in order to prevent misoperation. Similarly, if the optical navigation system 1 is lifted too high to receive large amount of ambient light, the navigation unit 15 may be stopped outputting the movement value through the ambient light detection in order to prevent misoperation.

It should be mentioned that both of the liftoff detection and the ambient light detection of the optical navigation system 1 may stop outputting the movement value to prevent misoperation. Therefore, it is possible to implement only one of them, but the present disclosure is not limited thereto. The liftoff detection and the ambient light detection do not conflict with each other and may work independently or cooperatively. For example, the optical navigation system 1 maintains a first mode when not detecting liftoff and ambient light, the optical navigation system 1 enters a second mode when detecting liftoff but not detecting ambient light, and the optical navigation system 1 enters a third mode when detecting liftoff and ambient light simultaneously. How the liftoff detection and the ambient light detection work depends on the number of modes carried by the optical navigation system 1. It should be mentioned that said second mode and third mode may further involve other functions such as operating in cooperation with an accelerometer or a gyroscope or operating in cooperation with image variation of reference light detected by additional image sensors except stop outputting movement values.

Referring to FIGS. 4-5 continuously, the method of liftoff detection includes the following steps: setting a threshold value Lthr (step S01); exposing the photosensitive unit 12 when the light source 10 is being turned on (step S11); reading first image data from the photosensitive unit 12 (step S21); exposing a part of the photosensitive unit 12 when the light source 10 is turned off (step S12); reading second image data from the part of the photosensitive unit 12 (step S22); calculating the second light intensity I2 of the second image data (step S32); calculating the first light intensity I1 of the first image data and a difference value between the first light intensity I1 and the second light intensity I2 (step S31); identifying whether the difference value is smaller than the threshold value Lthr (step S41); and entering a liftoff mode when the difference value is smaller than the threshold (step S51); otherwise, going back to the step S11.

The threshold value Lthr is, for example, determined according to a difference value between the light intensity of two images obtained by respectively exposing the photosensitive unit 12 when the light source 10 is turned on and off, and pre-stored in the processing unit 16 before shipment of the optical navigation system 1 or during the initializing procedure (or self-calibrating procedure). In the present embodiment, the step S11 is performed, for example, in the first period T1 of the first image frame F1 of FIG. 4. The step S21 is performed, for example, in the second period T2 of the first image frame F1 of FIG. 4. The step S12 is performed, for example, in the second period T2 of the first image frame F1 of FIG. 4. The step S22 is performed, for example, in the first period T1 of the second image frame F2 of FIG. 4. The steps of S32, S31, S41 and S51 are performed, for example, in the first period T1 of the second image frame F2 of FIG. 4.

Referring to FIGS. 4-5 continuously, the method of ambient light detection includes the following steps: setting reference light intensity Iref (step S02); exposing a part of the photosensitive unit 12 when the light source 10 is turned off (step S12); reading second image data from the part of the photosensitive unit 12 (step S22); calculating the second light intensity I2 of the second image data (step S32); identifying whether the second light intensity I2 is greater than the reference light intensity Iref (step S42); and entering an ambient light mode when the second light intensity I2 is greater than the reference light intensity Iref (step S52); otherwise, going back to the step S12.

The reference light intensity Iref is a predetermined value or image light intensity obtained by exposing the photosensitive unit 12 or exposing the part of the photosensitive unit 12 when the light source 10 is turned on and off, and pre-stored in the processing unit 16 before shipment of the optical navigation system 1 or during the initializing procedure (or self-calibrating procedure). In the present embodiment, the step S12 is performed, for example, in the second period T2 of the first image frame F1 of FIG. 4. The step S22 is performed, for example, in the first period T1 of the second image frame F2 of FIG. 4. The steps of S32, S42 and S52 are performed, for example, in the first period T1 of the second image frame F2 of FIG. 4.

Figure 6:
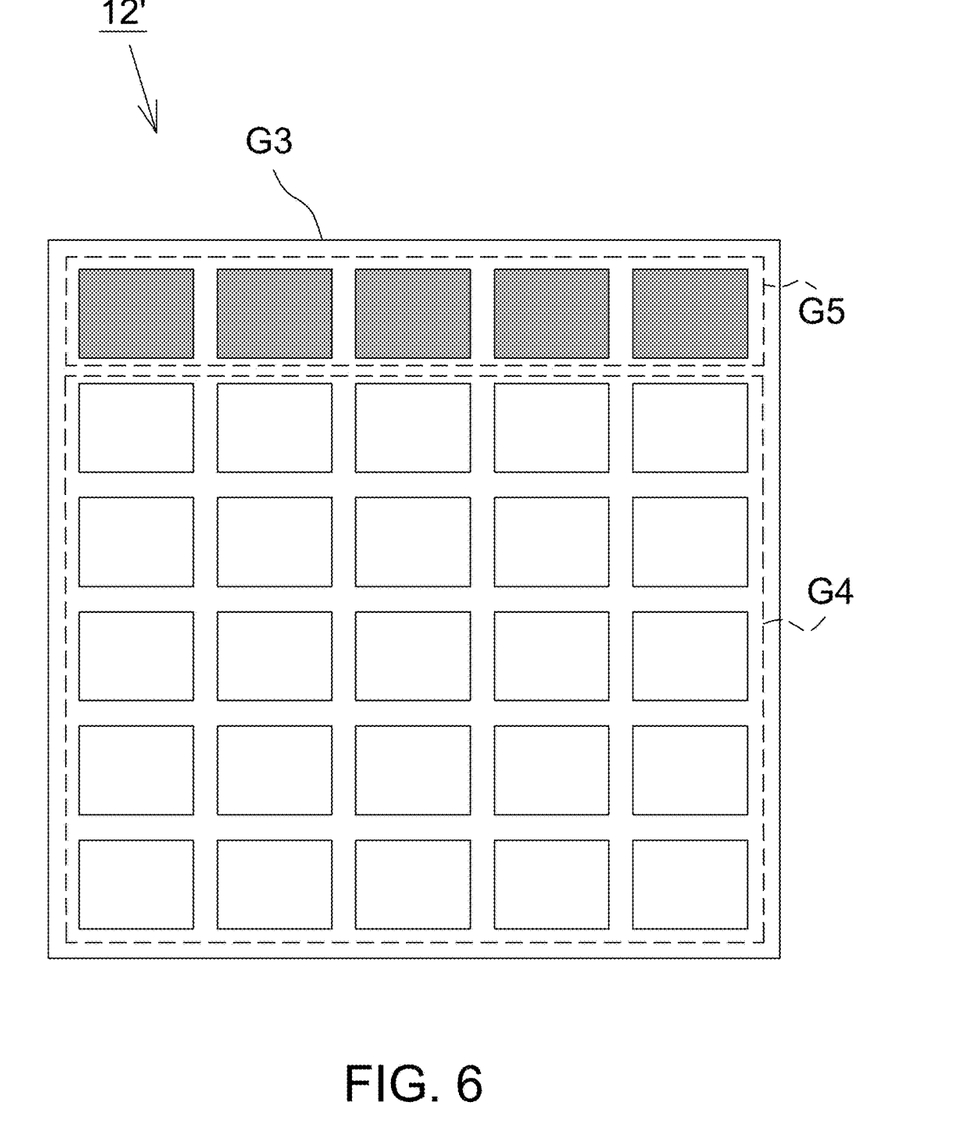
FIG. 6 is a schematic diagram of a photosensitive unit according to a second embodiment of the present disclosure.

FIG. 6 is a schematic diagram of a photosensitive unit 12' according to the second embodiment of the present disclosure. In some embodiments, a pixel array G3 of the photosensitive unit 12' and the pixel array G1 of the photosensitive unit 12 in the first embodiment (referring to FIG. 3) are the same element. However, the difference between the pixel array G3 of the second embodiment and the pixel array G1 of the first embodiment is that the pixel array G3 further has a coated pixel array G5, and the coated pixel array G5 is one row of the pixel array G3 covered with a coating. Therefore, the other pixel array in the pixel array G3 without the coating (i.e. uncoated pixel array G4) is referred to a first photosensitive unit 121 and the coated pixel array G5 is referred to a second photosensitive unit 122 herein, wherein the coating of the second photosensitive unit 122 is configured to block the light emitted from the light source 10. That is to say, the coated pixel array G5 of the present embodiment is one row of the pixel array G3. Therefore, the first photosensitive unit 121 and the second photosensitive unit 122 are coupled to identical driving circuit and reading circuit.

In other embodiments, the coated pixel array G5 is an additional pixel array disposed independently from the pixel array G3. Therefore, the first photosensitive unit 121 and the second photosensitive unit 122 are coupled to different driving circuits and reading circuits. That is to say, the coated pixel array G5 and the uncoated pixel array G4 are coupled to identical driving circuit and reading circuit or different driving circuits and reading circuits and controlled by the control unit 14.

In the optical navigation system 1 according to the second embodiment of the present disclosure, the photosensitive unit 12 of the optical navigation system 1 according to the first embodiment is replaced by the first photosensitive unit 121 and the second photosensitive unit 122. Therefore, the optical navigation system 1 configured to be operated on the working surface S includes the light source 10, the first photosensitive unit 121, the second photosensitive unit 122, the control unit 14, the navigation unit 15 and the processing unit 16. The light source 10, the first photosensitive unit 121 and the second photosensitive unit 122 are electrically connected to and controlled by the control unit 14. The control unit 14 and the navigation unit 15 are electrically connected with the processing unit 16.

In the present embodiment, the first photosensitive unit 121 and the second photosensitive unit 122 are shown to be the sensing surface on the same plane. In other embodiments, the first photosensitive unit 121 and the second photosensitive unit 122 have separated sensing surfaces. For example, the second photosensitive unit 122 and the first photosensitive 121 are disposed at different positions.

The light source 10 is configured to emit light of a predetermined wavelength. The first photosensitive unit 121 is configured to receive reflected light of the predetermined wavelength reflected by the working surface S. The second photosensitive unit 122 is covered with the coating to block the light of the predetermined wavelength. The control unit 14 is configured to control the light source 10, the first photosensitive unit 121 and the second photosensitive unit 122 so as to expose the first photosensitive unit 121 and the second photosensitive unit 122 simultaneously when the light source 10 is being turned on. The processing unit 16 is configured to read first image data and second image data respectively from the first photosensitive unit 121 and the second photosensitive unit 122.

Figure 7:
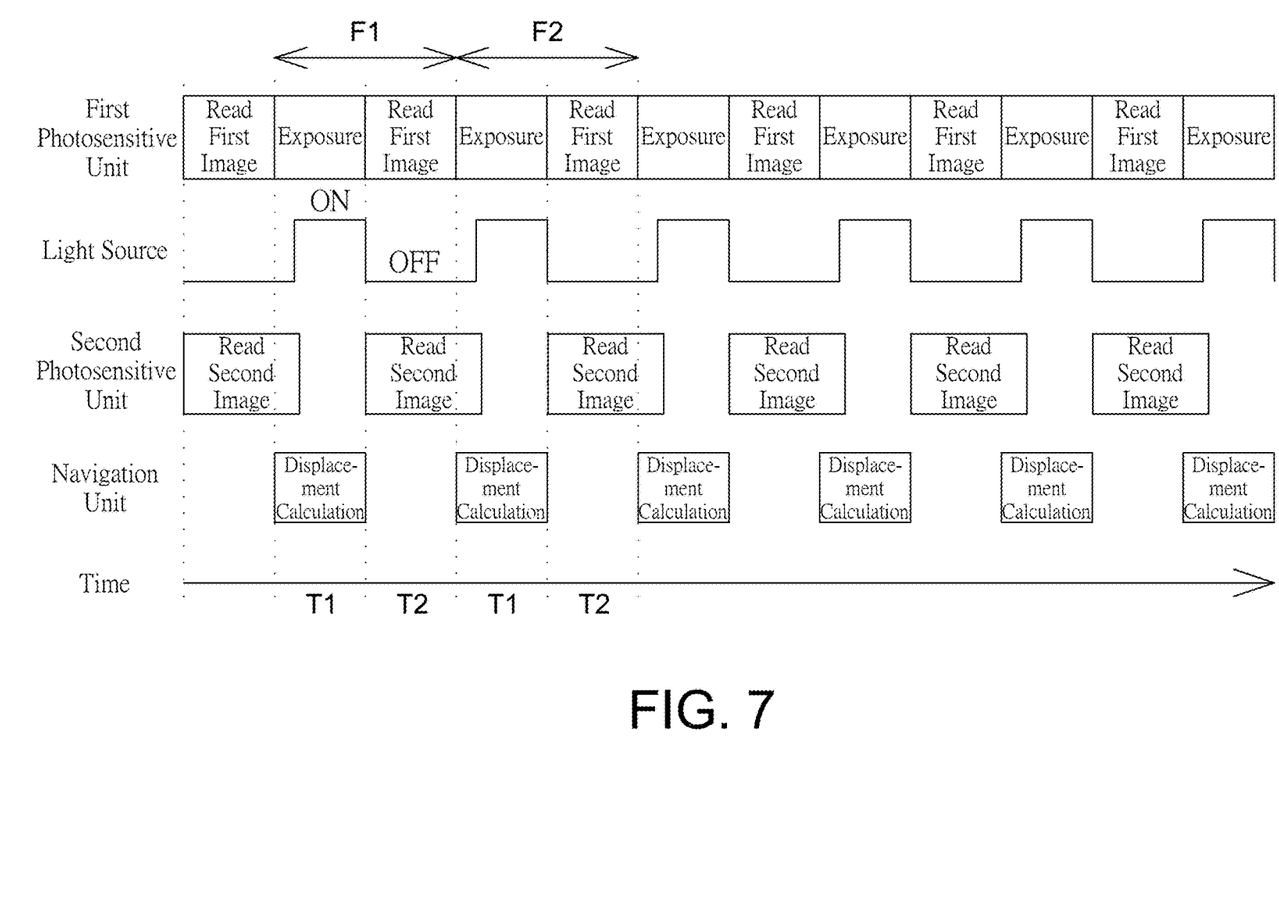
FIG. 7 is a timing diagram of a detection method of the optical navigation system according to the second embodiment of the present disclosure.

FIG. 7 is a timing diagram of a detection method of the optical navigation system 1 according to the second embodiment of the present disclosure. Referring to FIGS. 2, 6 and 7 together, in the detection method the first photosensitive unit 121 and the second photosensitive unit 122 covered with the coating are used to repeatedly capture image frames (e.g. using a first image frame F1 and a second image frame F2 to describe herein) and each of the image frames has a first period T1 and a second period T2. The detection method includes the following steps: turning on the light source 10 and simultaneously exposing the first photosensitive unit 121 and the second photosensitive unit 122 in the first period T1 of a first image frame F1; turning off the light source 10 in the second period T2 of the first image frame F1 and reading first image data from the first photosensitive unit 121; and reading second image data from the second photosensitive unit 122 in the second period T2 of the first image frame F1 or the first period T1 of a second image frame F2, wherein the first image data has first light intensity and the second image data has second light intensity, and the second image frame F2 is a successive image frame following the first image frame F1.

As mentioned above, the navigation unit 15 calculates a movement value, in the first period T1 of the second image frame F2, corresponding to the first image frame F1.

It should be mentioned that the processing unit 16 of the present embodiment reading the second image data from the second photosensitive unit 122 in the second period T2 of the first image frame F1 or the first period T1 of the second image frame F2 is determined by whether the first photosensitive unit 121 and the second photosensitive unit 122 are coupled to an identical driving circuit or different driving circuits. For example, when the first photosensitive unit 121 and the second photosensitive unit 122 are coupled to an identical driving circuit, the processing unit 16 successively reads the first image data in the second period T2 of the first image frame F1 and the second image data in the first period T1 of the second image frame F2 through the driving circuit; whereas when the first photosensitive unit 121 and the second photosensitive unit 122 are coupled to different two driving circuits, the processing unit 16 simultaneously or sequentially reads the first image data and the second image data in the second period T2 of the first image frame through the driving circuits. Therefore, the block of "read a second image" indicates the time period for the second photosensitive unit 122 to read the second image data, and the exact time for the second photosensitive unit 122 to read the second image data depends on the arrangement of the photosensitive unit and the driving circuit mentioned above.

Figure 8:
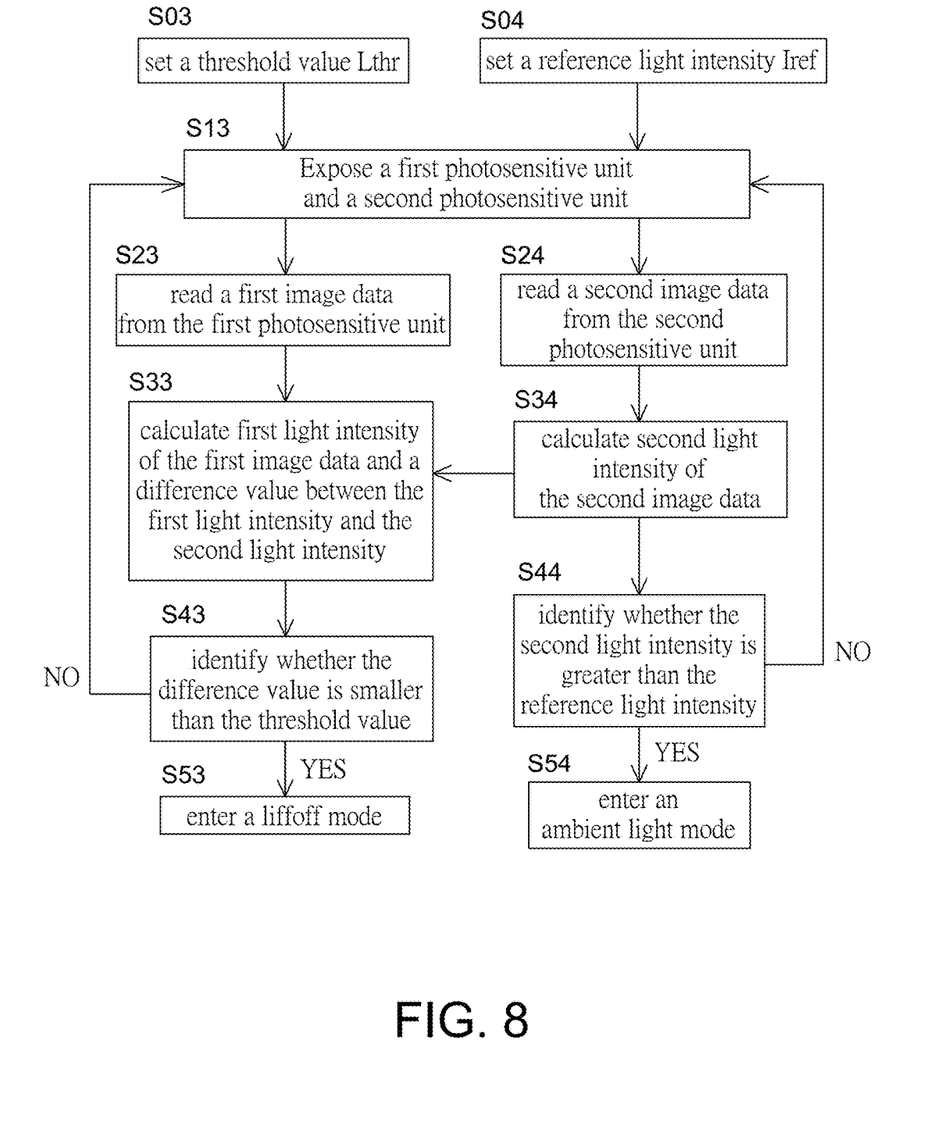
FIG. 8 is a flow chart of the detection method of the optical navigation system according to the second embodiment of the present disclosure.

FIG. 8 is a flow chart of the detection method of the optical navigation system 1 according to the second embodiment of the present disclosure. Similarly, the detection method has functions of liftoff detection and ambient light detection. In the second embodiment, except the photosensitive unit, the other elements are similar to those in the first embodiment. The difference between the first embodiment and the second embodiment is the controlling timing corresponding to the photosensitive unit.

Referring to FIGS. 7-8 continuously, the liftoff detection method includes the following steps: setting a threshold value Lthr (step S03); exposing the first photosensitive unit 121 and the second photosensitive unit 122 simultaneously when the light source 10 is being turned on (step S13); reading the first image data from the first photosensitive unit 121 when the light source 10 is turned off (step S23); reading the second image data from the second photosensitive unit 122 when the light source 10 is turned off (step S24); calculating the second light Intensity I2 of the second image data (step S34); calculating the first light intensity I1 of the first image data and a difference value between the first light intensity I1 and the second light intensity I2 (step S33); identifying whether the difference value is smaller than the threshold value Lthr (step S43); and entering a liftoff mode when the difference value is smaller than the threshold value Lthr (step S53); otherwise, going back to the step S13.

In the present embodiment, the step S13 is performed, for example, in the first period T1 of the first image frame F1 of FIG. 7. The steps of S13 and S24 are performed, for example, in the second period T2 of the first image frame F1 of FIG. 7. The steps of S24, S34, S33, S43 and S53 are performed, for example, in the first period T1 of the second image frame F2 of FIG. 7.

Referring to FIGS. 7-8 continuously, the ambient light detection method includes the following steps: setting a reference light intensity Iref (step S04); exposing the first photosensitive unit 121 and the second photosensitive unit 122 simultaneously when the light source 10 is being turned on (step S13); reading the second image data from the second photosensitive unit 122 when the light source 10 is turned off (step S24); calculating the second light intensity I2 of the second image data (step S34); identifying whether the second light intensity I2 is greater than the reference light intensity Iref (step S44); and entering an ambient light mode when the second light intensity I2 is greater than the reference light intensity Iref; otherwise, going back to the step S13.

In the present embodiment, the step S13 is performed, for example, in the first period T1 of the first image frame F1 of FIG. 7. The step S24 is performed, for example, in the second period T2 of the first image frame F1 of FIG. 7. The steps of S24, S34, S44 and S54 are performed, for example, in the first period T1 of the second image frame F2 of FIG. 7.

The method of obtaining the threshold value Lthr and the reference light intensity Iref is described in the first embodiment, and thus details thereof are not described herein.

In the above embodiments, the first light intensity I1 may be a maximum gray level or an average gray level of the first image data, and the second light intensity I2 may be a maximum gray level or an average gray level of the second image data. Since the optical navigation system 1 may read a plurality of first image data and second image data according to continuously captured images, in other embodiments, the first light intensity I1 is an average gray level of a plurality of first image data or other calculated results; and the second light intensity I2 is an average gray level of a plurality of second image data or other calculated results. In other words, the processing unit 16 performs a determination every two more than two image frames (e.g. once every 4 image frames, once every 6 image frames and so on).

In the above embodiments, the control unit 14, the navigation unit 15 and the processing unit 16 are respectively corresponding to independent elements with different functions, but the present disclosure is not limited thereto. In other embodiments, the function of the control unit 14 and the navigation unit 15 are be integrated into the processing unit 16 so that the processing unit 16 directly controls the turning on/off of the light source 10, exposes the photosensitive unit 12, calculates light intensity of image, determines operation modes and calculates movement values.

As mentioned above, the conventional method which detects liftoff though inserting a dark image between two bright images may increase a time gap between the two bright images thereby causing the problem of frequency (or bandwidth) decrease. Therefore, the present disclosure provides an optical navigation system and detection method thereof that improves the timing control of the photosensitive element so as to detect ambient light and liftoff, and achieves, without reducing the tracking frame rate of the optical navigation system, the effect of avoiding mistakenly outputting displacement.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A detection method of an optical navigation system, using a photosensitive unit to repeatedly capture image frames and each of the image frames comprising a first period and a second period, the detection method comprising:
   turning on a light source and exposing the photosensitive unit in the first period of a first image frame;
   reading first image data from the photosensitive unit in the second period of the first image frame;
   turning off the light source and exposing a part of the photosensitive unit in the second period of the first image frame; and
   reading second image data from the part of the photosensitive unit in the first period of a second image frame,
   wherein the first image data comprises first light intensity and the second image data comprises second light intensity, and the second image frame is a successive image frame following the first image frame.

2. The detection method as claimed in claim 1, further comprising:
   entering an ambient light mode when the second light intensity is greater than reference light intensity.

3. The detection method as claimed in claim 1, further comprising:
   calculating a difference value between the first light intensity and the second light intensity; and
   entering a liftoff mode when the difference value is smaller than a threshold.

4. The detection method as claimed in claim 3, wherein the first light intensity is a maximum gray level or an average gray level of the first image data, and the second light intensity is a maximum gray level or an average gray level of the second image data.

5. The detection method as claimed in claim 1, further comprising:
   continuously reading, using a processing unit, the first image data and the second image data.

6. The detection method as claimed in claim 1, wherein the part of the photosensitive unit is exposed simultaneously when the first image data other than the part of the photosensitive unit is being read.

7. The detection method as claimed in claim 1, further comprising:
   calculating a movement value, using a navigation unit, corresponding to the first image frame in the first period of the second image frame.

8. A detection method of an optical navigation system, using a first photosensitive unit and a second photosensitive unit covered with a coating to repeatedly capture image frames and each of the image frames comprising a first period and a second period, the detection method comprising:
   turning on a light source and simultaneously exposing the first photosensitive unit and the second photosensitive unit in the first period of a first image frame;
   turning off the light source in the second period of the first image frame and reading first image data from the first photosensitive unit; and
   reading second image data from the second photosensitive unit in the second period of the first image frame or the first period of a second image frame,
   wherein the first image data comprises first light intensity and the second image data comprises second light intensity, and the second image frame is a successive image frame following the first image frame.

9. The detection method as claimed in claim 8, further comprising:
   entering an ambient light mode when the second light intensity is greater than reference light intensity.

10. The detection method as claimed in claim 8, further comprising:
    calculating a difference value between the first light intensity and the second light intensity; and
    entering a liftoff mode when the difference value is smaller than a threshold.

11. The detection method as claimed in claim 10, wherein the first light intensity is a maximum gray level or an average gray level of the first image data, and the second light intensity is a maximum gray level or an average gray level of the second image data.

12. The detection method as claimed in claim 8, wherein the coating of the second photosensitive unit is configured to block light emitted from the light source.

13. The detection method as claimed in claim 8, further comprising:
    calculating a movement value, using a navigation unit, corresponding to the first image frame in the first period of the second image frame.

14. The detection method as claimed in claim 8, wherein the first photosensitive unit and the second photosensitive unit are coupled to an identical driving circuit or different driving circuits.

15. An optical navigation system configured to be operated on a working surface, the optical navigation system comprising:
    a light source configured to emit light of a predetermined wavelength;

a first photosensitive unit configured to receive reflected light of the predetermined wavelength reflected by the working surface;

a second photosensitive unit covered with a coating to block the light of the predetermined wavelength;

a control unit configured to control the light source, the first photosensitive unit and the second photosensitive unit to simultaneously expose the first photosensitive unit and the second photosensitive unit when the light source is being turned on; and a processing unit configured to read first image data and second image data respectively from the first photosensitive unit and the second photosensitive unit.

16. The optical navigation system as claimed in claim 15, wherein the second image data comprises second light intensity, and an ambient mode is entered when the processing unit identifies the second light intensity is greater than reference light intensity.

17. The optical navigation system as claimed in claim 15, wherein the first image data comprises first light intensity and the second image data comprises second light intensity, and a liftoff mode is entered when the processing unit identifies a difference value between the first light intensity and the second light intensity is smaller than a threshold.

18. The optical navigation system as claimed in claim 17, wherein the first light intensity is a maximum gray level or an average gray level of the first image data, and the second light intensity is a maximum gray value or an average gray level of the second image data.

19. The optical navigation system as claimed in claim 15, wherein the first photosensitive unit and the second photosensitive unit are coupled to an identical driving circuit or different driving circuits.

20. The optical navigation system as claimed in claim 15, wherein a sensing surface of the first photosensitive unit and a sensing surface of the second photosensitive unit are on a same plane or separated surfaces.

* * * * *